United States Patent Office 2,915,493
Patented Dec. 1, 1959

2,915,493

SOLUTION OF VINYLIDENE MONOMER AND HYDROXY POLYESTER MODIFIED WITH AN ISOCYANATE AND AN UNSATURATED ETHER ALCOHOL AND METHOD OF PREPARING SAME

Günther Nischk and Heinrich Meckbach, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware No Drawing. Application February 12, 1957
Serial No. 639,629

Claims priority, application Germany February 17, 1956

6 Claims. (Cl. 260—45.4)

This invention relates to new copolymers, to a process for producing the same from unsaturated polyesters, unsaturated ether alcohols, polyisocyanates and vinyl compounds, and to fast-drying lacquers, coatings and films prepared therefrom.

The copolymerization of unsaturated polyesters obtained from polybasic acids and polyhydric alcohols with vinyl or allyl compounds has been known for a relatively long time. $\alpha,\beta$-unsaturated dicarboxylic acids or their anhydrides, such as, for example, maleic acid, fumaric acid or maleic acid anhydride, have been used as unsaturated components for the production of these polyesters. Adipic acid, succinic acid, phthalic acid, tetrachlorophthalic acid and other acids which are not ethylenically unsaturated or their anhydrides can be concurrently used in the production of the polyesters for the purpose of modifying the properties of the subsequently obtained copolymers. Ethylene glycol, butanediol-1,3 and propylene glycol-1,2 are the polyhydric alcohols which have preferably been esterified with the above unsaturated acids. The unsaturated polyesters produced by thermal esterification from these components have been mixed with vinyl or allyl compounds and copolymerized in the presence of polymerization catalysts.

Another process for the production of polymers consists in chain-lengthening unsaturated polyesters carrying free hydroxyl groups with polyisocyanates, in which case water-resistant polymers are obtained after the copolymerization with vinyl or allyl compounds has taken place.

If the copolymerization of such unsaturated polyesters with vinyl and/or allyl compounds takes place in the presence of atmospheric oxygen, the boundary surface between polyester and air remains tacky. To obtain polymers that are dry and non-sticking at the surface, these boundary surfaces must be covered or, during the curing step, inert gases must be passed over. Alternately, this disadvantage can be overcome by certain wax additives. However, a procedure requiring the exclusion of air creates serious operating problems and wax additives exude at the surface on polymerization.

It is, therefore, a primary object of the present invention to provide new copolymers which dry completely and in a short time at room temperature. Another object of the invention is to provide copolymers which are suitable for the formulation of fast-drying lacquers, coatings and films. A further object is to provide a simple and economical method of making these new copolymers. A further object is to provide fast-drying lacquers, coatings and films. Still further objects will appear hereinafter.

These objects are accomplished in accordance with the present invention by reacting an unsaturated hydroxyl polyester with a $\beta,\gamma$-unsaturated ether alcohol and a polyisocyanate, and copolymerizing the product obtained with a copolymerizable vinyl monomeric compound.

The unsaturated hydroxyl polyesters used in the practice of the invention can be linear or branched. They are obtained by the conventional thermal esterification of alpha,beta-unsaturated dicarboxylic acids or dicarboxylic acid anhydrides with polyhydric alcohols, using an excess of the alcohol component in order to obtain a polyester which has mainly hydroxyl end groups. Any suitable polyhydric alcohol may be used but glycols, such as, for example, ethylene glycol, diethylene glycol and butanediol-1,3, and trihydric alcohols, such as trimethylol propane and glycerol, are among the most common polyhydric alcohols used in the preparation of the unsaturated hydroxyl polyesters. In addition, it is possible to use glycols which contain a tertiary amino group, such as, for example, p-dihydroxyethylamino-diphenyl or dihydroxyethyl aniline. Any suitable unsaturated carboxylic acids or anhydrides may be used for the production of the unsaturated hydroxyl polyesters including maleic acid, fumaric acid, itaconic acid, oleic acid, ricinoleic acid, maleic anhydride and itaconic anhydride. It is also possible for acids which are not ethylenically unsaturated to be concurrently used, such as, for example, adipic acid, stearic acid, phthalic acid, tetrachlorophthalic acid or hexachloro endomethylene tetrahydrophthalic acid, as well as their anhydrides. Polyesters with hydroxyl numbers higher than 100, preferably 150–300, and having acid numbers of about 2 to 30, have proved to be particularly suitable.

Any suitable monohydric and polyhydric beta,gamma-unsaturated ether alcohols may be employed in the practice of the invention. Particularly suitable are organic compounds which have aliphatically linked hydroxy groups and contain the grouping $$CH_2=CH-CH.R-O-$$

one or more times in the molecule; R standing for a hydrogen atom or an alkyl radical, such as, for example, a methyl or ethyl group. An example of such a compound is $\beta$-hydroxy-ethyl-allyl ether, which can be obtained in a simple manner by hydroxyethylation of allyl alcohol, it being possible for one or more hydroxy-ethyl groups to be introduced into the alcohol. Suitable products can also be obtained if instead of ethylene oxide, other epoxides, such as propylene oxide or glycide, are reacted with allyl alcohol. It is also possible to use other $\beta,\gamma$-unsaturated ether alcohols, such as, for example, glycerol monoallyl ether, trimethylol propane monoallyl ether or glycerol diallyl ether. As examples of additional ether alcohols, there may be mentioned monohydric or polyhydric alcohols which contain the grouping 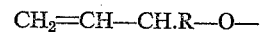—$OCH_2$—$CH=CH$—$CH_2$—$O$—. Such compounds can, for example, be obtained by reacting butene-(2,3)-diol-1,4 with alkylene oxides. Mono- and dihydroxy ethyl-butene-2,3-diol-1,4 are examples of such compounds.

The process of the invention also contemplates the use of mixtures of saturated alcohols with $\beta,\gamma$-unsaturated ether alcohols so that it is possible to operate with relatively small amounts of unsaturated ether alcohols. Any suitable saturated alcohol, such as, for example, glycol monoethyl ether, cyclohexanol and butanediol-1,3 may be used concurrently with the $\beta,\gamma$-unsaturated ether alcohols.

Any suitable organic isocyanate may be used in the practice of the invention either of aromatic, hydroaromatic or aliphatic nature, illustrative examples including hexamethylene diisocyanate, cyclohexane-1,4-diisocyanate, 1,2,4- and 1,2,6-toluylene diisocyanate, m-xylylene diisocyanate, 4-ethyl-m-xylylene diisocyante, 4,5-dimethyl-m-xylylene diisocyanate, 2,6-dimethyl-p-xylylene diisocyanate, 1,3-dimethyl-4,5-xylylene diisocyanate and 4,4'-diphenyl-dimethyl methane diisocyanate.

In carrying out the process of the invention, the unsaturated hydroxyl polyester is mixed at room temperature or elevated temperature with the β,γ-unsaturated ether alcohol and thereafter reacted with the polyisocyanate. The reaction temperature may range from about 0° C. to about 160° C. but may be as high as about 200° C. if oxygen is excluded during the reaction. The amount of polyisocyanate advantageously being so chosen that it is at the most equivalent to the number of hydroxyl groups contained in the polyester and the ether alcohol, more especially the polyisocyanate is used in amount of 0.5 to 0.99 mol equivalent preferably in amount of 0.8 to 0.99 mol equivalent. In this reaction, the β,γ-unsaturated ether alcohol is linked through urethane groups to the polyester. It is, however, also possible to add to the unsaturated hydroxyl polyester an excess of a polyisocyanate, the excess being calculated on the hydroxyl number of the unsaturated polyester. In this case, there is formed an unsaturated polyester with free isocyanato groups, which is subsequently reacted with the β,γ-unsaturated ether alcohol. This second method is particularly suitable with hydroxyl polyesters which are of linear structure. In these reactions, linear polyesters are preferably combined with polyhydric ether alcohols whereas branched polyesters are preferably reacted with monohydric ether alcohols. In case of using linear polyesters at least one mol of polyhydric ether alcohol should be employed for each ten mols of linear polyester. On the other hand four mols of polyhydric ether alcohol are considered to be the upper limit for each mol of the linear polyester. The preferred molecular ratio of ether alcohol/linear polyester is 1:4 to 2:1. In case of branched polyesters used in combination with monohydric ether alcohols 0.6 molecule of alcohol should be present for each OH group of the polyester. It is, however, preferred to use about one up to about two molecules of monohydric ether alcohol per OH group of branched polyester. In this way, reaction products are obtained which do not have any free isocyanate groups.

As a result of the first reaction step, there is obtained a copolymerizable polyester containing both β,γ-unsaturated ether groups and urethane groups. In the next reaction step, this intermediate which need not be isolated from the reaction mixture is dissolved in a copolymerizable vinyl compound. It is advisable to add to this solution a polymerization retarding agent, such as, for example, hydroquinone or cupric salts, for stabilization purposes. The polymerization of these solutions takes place at room temperature, preferably in the presence of polymerization catalysts comprising an organic peroxide, such as, for example, benzoyl peroxide, cyclohexanone peroxide and cumene peroxide, and a heavy metal siccative, such as for example, a compound of cobalt, lead and manganese which is soluble in the reaction mixtures. Examples of suitable heavy metal siccatives include the naphthenates, halides and oleates or cobalt, lead and manganese or other metal salts which are usually used for the processing of drying oils.

Any suitable copolymerizable vinylidene compound may be utilized in the practice of the invention, representative examples including styrene, methacrylic esters, acrylic esters, divinyl benzene, diallyl phthalate and triallyl cyanurate. The copolymerizable vinylidene compound may constitute about 10% to about 200% preferably about 40% to about 80% of the mixture to be copolymerized.

The copolymers obtained by the present process are characterized by a high resistance to saponification, which might be caused by the introduction of the urethane groups.

In addition, the surprising observation was made that it is possible in this way to produce thixotropic polyester/vinyl or allyl mixtures. If the above-described polyisocyanate addition is carried out in the absence of atmospheric oxygen, addition products are obtained which yield more or less thinly liquid solutions in vinyl or allyl compounds. However, if the operation takes place in the presence of atmospheric oxygen, reaction products are obtained which form thixotropic solutions with vinyl or allyl compounds and consequently can be coated on to vertical walls without running down. Even mixtures which contain up to 60% of vinyl or allyl compound are thixotropic and become thinly liquid on stirring. However, these mixtures solidify again as soon as the stirring ceases.

The lacquer compositions are applied to the surfaces which are to be coated after all the components have been mixed together, for instance, by means of a spray gun. The final copolymerization of the unsaturated isocyanate modified polyester and the vinyl or allyl compound takes place after applying the lacquer or the coating. It is a special advantage of the copolymers of the present invention that they are applied as such without the use of any solvent or plastisizer. They harden easily on the coated surface to give a completely dry film in a short time. It is also possible to apply the components separately with two spray guns, in this case the components are first combined on the surface to be lacquered. It is likewise possible to produce from the copolymers described herein before molded bodies, such as, housings and containers having an absolutly dry surface.

The invention is further illustrated but not limited by the following examples in which parts and percentages are by weight.

*Example 1*

100 parts of an unsaturated polyester produced by condensation of 148 parts of phthalic anhydride, 175 parts of maleic anhydride, 350 parts of 1,3-butylene glycol and 70 parts of trimethylol propane with a hydroxyl number of 220 and an acid number of 14, are mixed at 50° C. with 40 parts of hydroxyethylated allyl alcohol with a hydroxyl number of 450. After the complete mixture has been thoroughly stirred, 58 parts of toluylene diisocyanate are added and the mixture is stirred for 30 minutes at 115–120° C. The reaction mixture, which becomes more viscous as the reaction proceeds, is dissolved in 135 parts of styrene which contains 0.1 part of copper oleate. 4 parts of cyclohexanone peroxide and 5 parts of a 10% cobalt naphthenate solution in styrene are dissolved in 100 parts of the said solution. The copolymerization starts after about 10 minutes at room temperature. Thinly applied films are dry after 6 hours. Such films can be buffed satisfactorily after as short a period as 24 hours. The lacquer has a silky lustre. Lustre value: 86.

*Example 2*

100 parts of the polyester described in Example 1 are stirred at 50° C. with 20 parts of hydroxyethylated allyl alcohol and 20 parts of cyclohexanol and thereafter mixed with 58 parts of toluylene diisocyanate. The temperature is maintained for another 30 minutes at 120° C. and then 135 parts of styrene containing 0.1 part of copper oleate are added. The polymerization is initiated with 4% cyclohexanone peroxide and 0.5% of cobalt naphthenate. In a thin layer, the polymer is non-tacky after about 6 hours. It can be buffed satisfactorily after 24 hours. Lustre value: 105.

*Example 3*

100 parts of the polyester described in Example 1 are stirred at 50° C. with 10 parts of hydroxyethylated allyl alcohol having the hydroxyl number 450 and 30 parts of cyclohexanol. 58 parts of toluylene diisocyanate are thereafter added and the temperature is allowed to rise. The mixture is stirred for another 30 minutes at 120° C. The reaction mixture is dissolved in 135 parts of styrene containing 0.5 part of copper oleate. The polymerization is initiated with 4% of cyclohexanone peroxide and 0.5% of cobalt naphthenate. An applied film is non-tacky after 6 hours. The buffing capacity of the lacquer is fairly good after 24 hours (slight buffing traces). Lustre value: 77.

*Example 4*

100 parts of a polyester produced from 75 parts of phthalic anhydride, 250 parts of maleic anhydride, 70 parts of trimethylol propane and 350 parts of 1,3-butylene glycol which has a hydroxyl number of 200 and an acid number of 8 are stirred with 43 parts of hydroxyethylated allyl alcohol of a hydroxyl number 440. 61 parts of toluylene diisocyanate are then added and the mixture is brought to 120° C. After 30 minutes, 135 parts of styrene and 0.1 part of copper oleate are incorporated by stirring. When a lacquer film which has been polymerized with 0.5% of cobalt naphthenate and 4% of cyclohexanone peroxide is brushed on, it can be buffed satisfactorily after 24 hours. Lustre value: 94; drying time: 6 hours.

*Example 5*

100 parts of the polyester described in Example 4 are thoroughly stirred at 50° C. with 23 parts of cyclohexanol and 20 parts of hydroxyethylated allyl alcohol. 61 parts of toluylene diisocyanate are added and the mixture is stirred for another 30 minutes at 120° C. It is then taken up in 135 parts of styrene containing 0.1 part of copper oleate. Polymerization is initiated with 4% of cyclohexanone peroxide and 1% of cobalt naphthenate. The polymerization commences after 10 minutes. Applied lacquer films are non-tacky after 5 hours and can be buffed comparatively well after 24 hours. Lustre value: 94.

The polyester resin solutions produced in this way have thixotropic properties. However, if the addition reaction is carried out in the presence of inert gases such as nitrogen or carbon dioxide, more or less thinly liquid solutions are obtained.

*Example 6*

100 parts of an unsaturated polyester produced from 148 parts of phthalic anhydride, 98 parts of maleic anhydride and 155 parts of ethylene glycol by thermal condensation which has an acid number of 3 and a hydroxyl number of 220, are initially reacted at 120° C. with 66 parts of hexamethylene diisocyanate to form an isocyanate-modified polyester. 35 parts of glycerol monoallyl ether and 0.1 part of copper oleate are thereafter incorporated by stirring at 120° C. and the temperature is kept at 120° C. for 30 minutes. After 100 parts of styrene and 100 parts of diallyl phthalate are added, the polymerization is initiated with 4% of cyclohexanone peroxide and 0.5% of cobalt naphthenate. Applied lacquers are non-tacky after 6 hours and can be buffed satisfactorily.

*Example 7*

100 parts of a polyester with a hydroxyl number of 150 and an acid number of 10, produced from 1 mol of maleic anhydride, 1 mol of phthalic anhydride, 1 mol of 1,3-butylene glycol and 1.5 mols of ethylene glycol, are mixed at 60° C. with 46.5 parts of toluylene diisocyanate. The temperature rises gradually to 100° C. The mixture is thereafter stirred for another 30 minutes at 120° C. and is then mixed with 60 parts of trimethylol propane diallyl ether. The mixture is stirred for another 20 minutes at 120° C. and taken up in 140 parts of styrene, which contains 0.03% of copper oleate.

The polymerization is initiated with 0.5% of cobalt naphthenate and 4% of cyclohexanone peroxide and yields a hard copolymer drying on the surface.

What is claimed is:

1. A method for making a composition adapted for coating substrates which comprises dissolving in a vinylidene compound the reaction product of both an hydroxyl terminated ethylenically unsaturated polyester and a beta, gamma-ethylenically unsaturated ether alcohol with from about 0.5 to about 0.99 mol equivalents of organic polyisocyanate based on the total number of hydroxyl groups of the said polyester and of the said alcohol; said polyester having been prepared by esterification of an ethylenically unsaturated dicarboxylic acid and a polyhydric alcohol.

2. The process of claim 1 wherein the vinylidene compound is styrene.

3. As a new composition of matter adapted for coating substrates, the reaction product of both an hydroxyl terminated ethylenically unsaturated polyester and a beta, gamma-ethylenically unsaturated ether alcohol with from about 0.5 to about 0.99 mol equivalents of organic polyisocyanate based on the total number of hydroxyl groups of the polyester and alcohol dissolved in a vinylidene compound; said polyester having been prepared by esterification of an ethylenically unsaturated dicarboxylic acid and polyhydric alcohol.

4. The product of claim 3 wherein the vinylidene compound is styrene.

5. The product of claim 3 wherein the reaction product is prepared from a (1) polyester obtained by esterification of phthalic anhydride, maleic anhydride, 1,3-butylene glycol and trimethylol propane, (2) hydroxy ethylated allyl alcohol and toluylene diisocyanate.

6. The product of claim 3 wherein the polyester is prepared from phthalic anhydride, maleic anhydride, 1,3-butylene glycol and ethylene glycol and is reacted with toluylene diisocyanate while in admixture with trimethylol propane diallyl ether.

References Cited in the file of this patent

UNITED STATES PATENTS

| 2,729,618 | Muller et al. | Jan. 3, 1956 |
| 2,780,613 | Rubens | Feb. 5, 1957 |

FOREIGN PATENTS

| 460,392 | Canada | Oct. 18, 1949 |